United States Patent Office 2,761,796
Patented Sept. 4, 1956

2,761,796

ELECTRIC GOUGING TOOL

Rene D. Wasserman, Stamford, Conn., assignor to Eutectic Welding Alloys Corporation, New York, N. Y., a corporation of New York No Drawing. Application June 16, 1952,
Serial No. 293,843

4 Claims. (Cl. 117—202)

My present invention relates to a specially coated tool designed particularly for use in a metal arc process for machining operations on various metals. More specifically, it concerns a covered gouging tool which is particularly suitable for gouging, chamfering, surfacing and other like edge and surface preparation applications. In some instances it may be highly desirable to use the instant type coated tool in cutting operations.

One of the prime purposes of the instant invention is to eliminate or replace the expensive and bulky oxy-acetylene process, with all its attendant inconveniences, by creating a special and novel industrial tool; the excellent features of which are due to the use of a particular covering or coating for achieving previously unobtainable characteristics in the finished surface of a machined base metal, while permitting the operation to be performed at a much increased rate of speed.

It is common practice to form coated welding rods to have a core metal on which is applied a protective flux coating or cover of varying compositions well known in the art. Such rods include a core metal having substantially the proper composition desired for the weld deposit formed thereby; one much used metal being mild steel with a low carbon content. In order, however, to assist the flow of weld metal from the rod to the base metal, it has been the common practice to provide protective flux coverings or coatings on the surface of the core metal. These coverings or coatings usually consisted of gum and/or resin with selected amounts of asbestos, cellulose, feldspar, clay, aluminum silicates, talcs, and titanium oxides, along with selected metallic oxides and non-metallic silicates. This type of coating has also performed fairly well in operations involving the cutting of base metals, but have not been particularly successful when used in edge preparation applications, such as gouging and chamfering. This inefficiency has been due in part to the conventional rods' inherent deep heat penetration, which has produced undesirable characteristics in the base metal underlying the gouged or chamfered portion and to the slow speed of operation required during the machining. Among the factors contributing to these undesirable features is the usual high content of hydrogen compounds in the cover coating material which have a tendency to form relatively large amounts of hydrogen gas and produce underbead cracks in the base metal and excessive splattering with an attendant uneven edge surface. As a result, the machining operation has been relatively slow and laborious, requiring constant attention.

It is therefore the main object of my invention to overcome such disadvantages and to produce a coated or covered gouging tool which will have the desired low degree of penetration without producing cracking when used for machining operations. It is a further object of my invention to provide a covering or coating for metal arc implements which has a high arc stabilizing and oxide removal characteristic. Still another object of my invention is to provide a gouging tool which will reduce the time of machining operations in about half. Other and distinct objects and additions of the invention will appear in the following description and claims.

It has been discovered that the above objects can be best accomplished by using a well-known core metal consisting of a basic mild steel welding wire having a carbon content of between .10 and .15%, although it will be readily appreciated that other core metals such as tungsten, alloy steel, and copper or nickel alloys may be used interchangeably with the instant covering or coating composition with the same excellent results. The mild steel core metal is preferred, however, since it is a well-known electrode material and provides desirable surfacing attributes on the exposed surface of various metals and alloys constituting machined base metal. In this respect the gouging tool of the instant invention readily provides a utility or "all purpose" machining tool having excellent characteristics for general purpose applications, such as salvaging or repairing under field conditions.

The coating or covering proposed to be used on such core metal consists of a composition of asbestos, cellulose, cryolite, ferrous carbonate, graphite, kaolin, manganese, silica, talc and zircon. Since asbestos, kaolin, silica, and talc all include a silicate, they are included in the general class defined as silicate-containing materials. With the coating or covering composition of the instant invention, surprising results have been observed during machining operations; among which are a very stable arc, complete removal of oxides from the base metal, substantial elimination of underbead cracks in the base metal, and few, if any thermal cracks in the base metal. These results are specific to the particular combination of coating or covering composition utilized.

The most important factor in achieving these unexpected, exceptional features of this new machining tool is the use of ferrous carbonate with specially selected ingredients for specific purposes. The great amount of ferrous carbonate, in combination with the zirconium compound and graphite supply the necessary elements for the excellent functioning of this tool with an unusually high velocity in the exothermic process.

The unusually high velocity of the instant exothermic process results from the rapid disassociation of ferrous carbonate at the tremendous temperatures of the electric arc and the reaction of ferric oxide which release great amounts of highly compressed carbon dioxide gases, producing acceleration in the disintegration of the metal part to be machined at a speed hitherto unknown in metallic arc applications.

To form the novel electrode coating or covering I employ a composition within the following ranges, the percentages being by weight:

| | Percent |
|---|---|
| Cryolite | 1–10 |
| Kaolin | 10–15 |
| Asbestos | 10–15 |
| Cellulose | 8–12 |
| Silica | 0.2–10 |
| Talc | 3–5 |
| Manganese | 0.1–10 |
| Zircon | 5–10 |
| Graphite | 2.5–7.5 |
| Ferrous carbonate | 30–50 |

A comparison of the instant flux composition with the ingredients normally contained in prior type covering compositions will immediately indicate a distinct departure therefrom. These prior compositions have normally contained calcium carbonate, iron oxide and ferrous manganese along with non-metallic silicates as separate ingredients. With the instant composition the necessary iron oxide is obtained through the disassociation of the ferrous carbonate with an attendant rapid formation of large amounts of carbon dioxide during this process. It will be readily appreciated that such action constitutes a distinct advantage over prior compositions utilizing the iron oxides as a separate element in combination with separate carbonates, in that gases therein produced aid the ionization path and cause the metal to disintegrate rapidly. The inclusion of manganese and silica as separate elements results in a finished surface which is clean and free of oxides.

These components are thoroughly mixed in powder form, and may be converted into a paste form for coating the core by the addition of water, and, if desired, a conventional water dispersing binding material; or, alternatively, may be embodied in a suitable adherent and sprayed or painted on the core metal. The quantity of coating or covering to be applied should be adjusted with reference to the amount of core metal so that the desired degree of penetration and quiet arc are obtained under given operating conditions.

The coating or covering for my novel tool may be used for gouging, chamfering and cutting operations of various type steels, tungsten, copper and copper alloys and/or nickel, along with cast iron and sheet metal. The customary edge preparation procedures may be employed with remarkably little splattering and a wider permissible variation in the magnitude of undershooting and overshooting currents during the welding operation. The base metals so prepared are outstanding in the smoothness and the cleanliness of the prepared edge surface, and are easily welded with other like prepared metal joints.

Having described my invention generally, I shall now illustrate it by a specific example. It should be understood, however, that my invention is by no means limited to the details given in this example.

*Example*

A basic mild steel welding wire containing .13% carbon and having a diameter of ⅛″ and coated or covered with a composition composed as follows:

| | Parts by weight |
|---|---|
| Asbestos | 10 |
| Cellulose | 10 |
| Cryolite | 2 |
| Ferrous carbonate | 38 |
| Graphite | 7 |
| Kaolin | 10 |
| Manganese | 8.5 |
| Silica | 1 |
| Talc | 4 |
| Zircon | 9.5 |

Said covering composition was applied to the core metal by painting, the thickness of the coating being adjusted to make the final diameter of the electrode to be 3/16″.

Metal arc gouging tools so prepared, when employed in the usual manner of edge preparation or cutting the steel and cast iron metals, readily produce edge surfaces displaying excellent corrosion resistance and little or no fissures. During the machining operation there is remarkably little splatter, and variations in undershooting and overshooting currents do not affect the established arc to the same degree as in electrodes using any prior type covering or coating compositions. The weld arc is highly stabilized and the slag formations on the base metal flow freely and easily.

It will be readily understood from the above disclosures that the instant invention provides a new, special industrial tool which is adapted to perform machine operations on diversified types of metals at a hitherto unobtainable rate of speed, and which results in a finished machined part having a surface free from oxides and cracks.

As many apparently widely different embodiments of this invention may be made without departing from the spirit and scope hereof, it is to be understood that this invention is not limited to the specific embodiments hereof, except as defined in the appended claims.

What is claimed is:

1. A new composition for forming coatings for welding electrodes consisting of a composition compounded within the following ranges:

| | Percent |
|---|---|
| Kaolin | 10–15 |
| Cryolite | 1–10 |
| Asbestos | 10–15 |
| Cellulose | 8–12 |
| Silica | 0.2–10 |
| Talc | 3–5 |
| Manganese | 0.1–10 |
| Zircon | 5–10 |
| Graphite | 2.5–7.5 |
| Ferrous carbonate | 30–50 |

2. A covered machine tool adapted for use as one terminal in an arcing electrical circuit composed of a core rod of mild steel having a carbon content of between .10 and .15% and a covering thereon having a composition within the constituent ranges set forth in claim 1:

| | Percent |
|---|---|
| Kaolin | 10–15 |
| Cryolite | 1–10 |
| Asbestos | 10–15 |
| Cellulose | 8–12 |
| Silica | 0.2–10 |
| Talc | 3–5 |
| Manganese | 0.1–10 |
| Zircon | 5–10 |
| Graphite | 2.5–7.5 |
| Ferrous carbonate | 30–50 |

3. A fluxing and ionization producing composition for use in electric-arc flame surfacing and finishing applications consisting essentially of ferrous carbonate, graphite and zircon in the relative proportions by weight of between 30 and 50%, 2.5 and 7.5% and 5 and 10%, respectively, between 23 and 45% of silicate-containing materials, between 1 and 10% of cryolite, between 8 and 12% of cellulose, and between 1 and 10% manganese.

4. A fluxing and ionization producing composition for use in metal surfacing and machining applications comprising a mixture including between 30% and 50% by weight of ferrous carbonate, between 2.5% and 7.5% by weight of graphite, and between 5% and 10% by weight of a zirconium compound, the remainder containing between 32.5% and 62.5% by weight of constituents of a substantially electrically non-conductive character as combined and selected from the group consisting of between 10 to 15% of asbestos, between 1 to 10% of cryolite, between 8 to 12% of cellulose, between 10 to 15% of kaolin, between 0.2 to 10% of silica, between 3 to 5% of talc, and between 0.1 to 10% of manganese.

References Cited in the file of this patent
UNITED STATES PATENTS

| 1,898,933 | Biers | Feb. 21, 1933 |
| 1,926,090 | Frickey et al. | Sept. 12, 1933 |
| 1,972,063 | Judy | Aug. 28, 1934 |
| 2,415,149 | Sjoman | Feb. 4, 1947 |